United States Patent
Matsuki et al.

(10) Patent No.: US 12,045,067 B2
(45) Date of Patent: Jul. 23, 2024

(54) FLIGHT MANAGEMENT APPARATUS AND FLIGHT MANAGEMENT METHOD

(71) Applicant: KDDI CORPORATION, Tokyo (JP)

(72) Inventors: Tomoaki Matsuki, Tokyo (JP); Masayuki Tachiiwa, Tokyo (JP); Hiroshi Kawana, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 208 days.

(21) Appl. No.: 17/410,610

(22) Filed: Aug. 24, 2021

(65) Prior Publication Data

US 2022/0229450 A1  Jul. 21, 2022

(30) Foreign Application Priority Data

Jan. 21, 2021 (JP) .................................. 2021-007892

(51) Int. Cl.
*G05D 1/00* (2024.01)
*B64C 39/02* (2023.01)

(52) U.S. Cl.
CPC .......... *G05D 1/1062* (2019.05); *B64C 39/024* (2013.01)

(58) Field of Classification Search
CPC .. G05D 1/1062; B64C 39/024; G08G 5/0013; G08G 5/0026; G08G 5/0039; G08G 5/0052; G08G 5/0069; G08G 5/0091
See application file for complete search history.

(56) References Cited

U.S. PATENT DOCUMENTS

| 7,546,206 B1* | 6/2009 | Miller ................. G08G 5/0091 701/120 |
| 2014/0032103 A1* | 1/2014 | Kolbe ................. G08G 5/0021 701/466 |

(Continued)

FOREIGN PATENT DOCUMENTS

| CN | 107221200 A | 9/2017 |
| JP | 2001-110000 A | 4/2001 |

(Continued)

OTHER PUBLICATIONS

Pilot's Guide to Foreflight Mobile v12.7 [online]. ForeFlight, Aug. 2020 [retrieved on Aug. 20, 2023]. Retrieved from the Internet: <URL:https://cloudfront.foreflight.com/docs/ff/12.7/v12.7%20-%20foreflight%20mobile%20pilot%20guide%20optimized.pdf> (Year: 2020).*

(Continued)

*Primary Examiner* — Peter D Nolan
*Assistant Examiner* — Peter Y Ning
(74) *Attorney, Agent, or Firm* — Foley & Lardner LLP (57) ABSTRACT

A flight management apparatus includes a condition information acquisition unit that acquires condition information including a weather condition for flight of a flight apparatus, the weather condition being associated with a position provided on a flight path or in a flight range in which the flight apparatus is scheduled to fly, a weather information acquisition unit that acquires weather information including weather at a current position at which the flight apparatus is positioned, or a scheduled position at which the flight apparatus is scheduled to be positioned, a determination unit that determines whether or not the weather satisfies the weather condition associated with the current position or the scheduled position in the condition information, and an (Continued)

output unit that outputs information corresponding to a determination result of the determination unit.

14 Claims, 7 Drawing Sheets

(56) References Cited

U.S. PATENT DOCUMENTS

| | | | | |
|---|---|---|---|---|
| 2017/0154535 | A1* | 6/2017 | Downey | H04W 4/029 |
| 2021/0005091 | A1* | 1/2021 | Raabe | G01C 21/26 |
| 2021/0027640 | A1* | 1/2021 | Meringer | G06Q 50/40 |
| 2021/0225176 | A1* | 7/2021 | Kusumi | G08G 5/0013 |
| 2023/0386346 | A1* | 11/2023 | Schwartz | G08G 5/0021 |
| 2024/0005803 | A1* | 1/2024 | Altus | G08G 5/0013 |

FOREIGN PATENT DOCUMENTS

| | | | | |
|---|---|---|---|---|
| JP | 2001110000 A | * | 4/2001 | |
| JP | 2014-025931 A | | 2/2014 | |
| JP | 2019-032661 A | | 2/2019 | |
| JP | 2019032661 A | * | 2/2019 | |
| JP | 2020057372 A | * | 4/2020 | G08G 5/0021 |
| WO | WO-2018/155700 A1 | | 8/2018 | |
| WO | WO-2020/136822 A1 | | 7/2020 | |
| WO | WO-2020136822 A1 | * | 7/2020 | G08G 5/0013 |

OTHER PUBLICATIONS

Pilot's Guide to Foreflight Mobile v12.7 [online]. ForeFlight, Aug. 2020 [retrieved on May 20, 2023]. Retrieved from the Internet: <URL:https://cloudfront.foreflight.com/docs/ff/12.7/v12.7%20-%20foreflight%20mobile%20pilot%20guide%20optimized.pdf> (Year: 2020).*

Office Action issued in corresponding Japanese Patent Application No. 2021-007892 dated May 11, 2021 with English translation.

Chinese Office Action for Chinese Appl. Ser. No. 202110959932.9 dated Mar. 29, 2024 (19 pages).

* cited by examiner

FIG. 7

FLIGHT MANAGEMENT APPARATUS AND FLIGHT MANAGEMENT METHOD

CROSS-REFERENCE TO RELATED APPLICATION

Priority is claimed on Japanese Patent Application No. 2021-007892, filed on Jan. 21, 2021, the content of which is incorporated herein by reference.

BACKGROUND OF THE INVENTION

Field of the Invention

The present invention relates to a flight management apparatus and a flight management method for managing information related to flight of a flight apparatus.

Description of Related Art

PCT International Publication No. WO 2018/155700 (hereinafter referred to as Patent Document 1) discloses a system that acquires a wind direction and a wind speed near a port on which a drone takes off and lands using a wind sensor disposed in the port, and determines whether or not take-off and landing can be performed in the port using the wind direction and the wind speed.

SUMMARY OF THE INVENTION

A flight apparatus such as a drone or a manned airplane flies in a location close to a building and performs different works or operations depending on locations. Thus, even in a case in which no problem occurs at a time of take-off and landing of the flight apparatus, a problem caused by weather may occur depending on the location in which the flight apparatus flies. However, the system disclosed in Patent Document 1 uses the wind direction and the wind speed around the port, and thus a determination related to the weather cannot be performed while considering the location in which the flight apparatus flies.

Therefore, the present invention has been conceived in view of such circumstances, and an object thereof is to suppress occurrence of a problem caused by weather in flight of a flight apparatus.

A flight management apparatus of a first aspect of the present invention includes: a condition information acquisition unit that acquires condition information including a weather condition for flight of a flight apparatus, the weather condition being associated with a position provided on a flight path or in a flight range in which the flight apparatus is scheduled to fly; a weather information acquisition unit that acquires weather information including weather at a current position at which the flight apparatus is positioned, or a scheduled position at which the flight apparatus is scheduled to be positioned; a determination unit that determines whether or not the weather satisfies the weather condition associated with the current position or the scheduled position in the condition information; and an output unit that outputs information corresponding to a determination result of the determination unit.

The determination unit may determine whether or not the weather at the current position at a current time satisfies the weather condition associated with the current position in the condition information.

The determination unit may determine whether or not the weather of the scheduled position predicted for a scheduled time at which the flight apparatus reaches the scheduled position satisfies the weather condition associated with the scheduled position in the condition information.

The flight management apparatus may further include an identification unit that identifies an alternative flight path or an alternative flight range different from the flight path or the flight range in a case in which the determination unit determines that the weather does not satisfy the weather condition, wherein the output unit outputs the alternative flight path or the alternative flight range.

The condition information acquisition unit may acquire the condition information including the weather condition that is associated with the position and an operation content or a work content to be performed by the flight apparatus, and the determination unit may determine whether or not the weather satisfies the weather condition associated with the current position or the scheduled position and the operation content or the work content to be performed at the current position or the scheduled position by the flight apparatus.

The condition information acquisition unit may acquire the condition information including the weather condition that is associated with the position and the number of other flight apparatuses flying in a predetermined region including the position, and the determination unit may determine whether or not the weather satisfies the weather condition associated with the current position or the scheduled position and the number in the predetermined region including the current position or the scheduled position.

The condition information acquisition unit may acquire the condition information including the weather condition that is associated with the position and a type of aircraft of the flight apparatus, and the determination unit may determine whether or not the weather satisfies the weather condition associated with the current position or the scheduled position and the type.

The condition information acquisition unit may acquire the condition information including the weather condition that is associated with each of a plurality of different positions provided on the flight path or in the flight range.

Before take-off of the flight apparatus, the determination unit may determine whether or not the take-off of the flight apparatus is possible on the basis of the weather on the flight path or in the flight range, and after the determination unit determines that the take-off of the flight apparatus is possible, the determination unit may determine whether or not the weather satisfies the weather condition during flight of the flight apparatus.

A flight management method of a second aspect of the present invention is a flight management method executed by a processor and includes: acquiring condition information including a weather condition for flight of a flight apparatus, the weather condition being associated with a position provided on a flight path or in a flight range in which the flight apparatus is scheduled to fly; acquiring weather information including weather at a current position at which the flight apparatus is positioned, or a scheduled position at which the flight apparatus is scheduled to be positioned; performing a determination as to whether or not the weather satisfies the weather condition associated with the current position or the scheduled position in the condition information; and outputting information corresponding to a result of the determination.

According to the present invention, an advantageous effect of being able to suppress occurrence of a problem caused by weather in flight of a flight apparatus is achieved.

DETAILED DESCRIPTION OF THE INVENTION

Summary of Flight Management System

Figure 1:
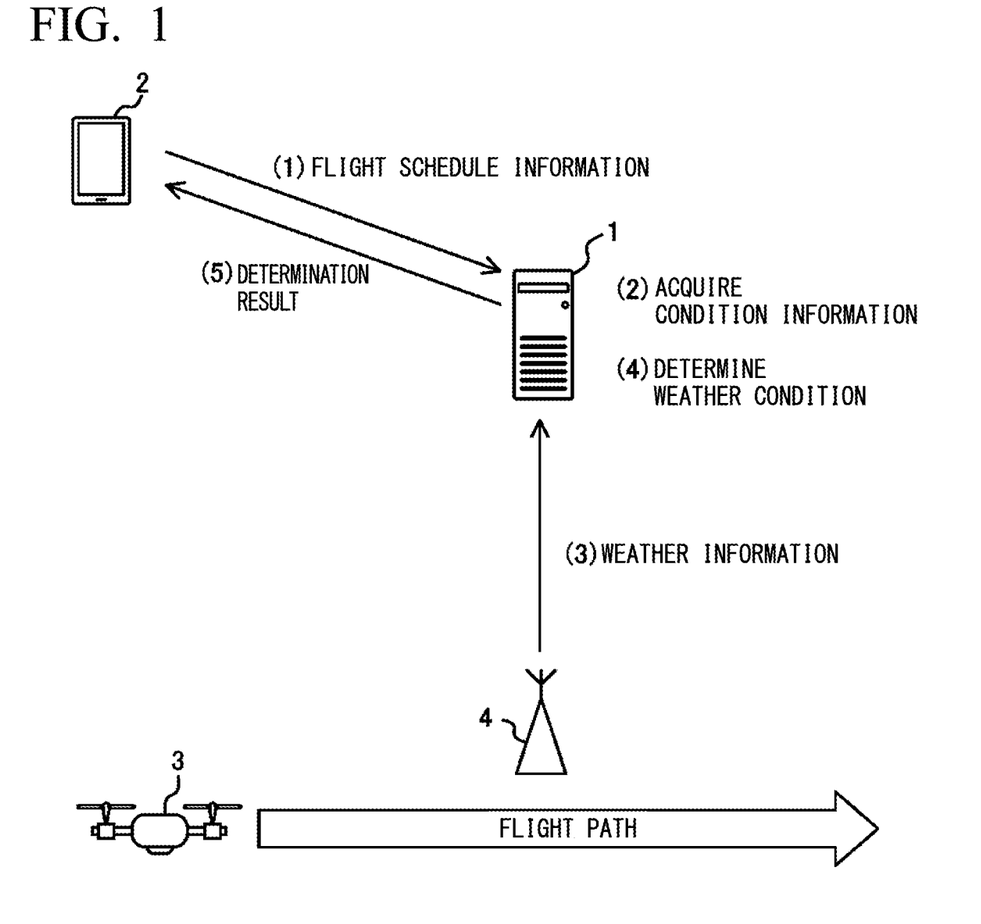
FIG. 1 is a schematic diagram of a flight management system according to an embodiment.

FIG. 1 is a schematic diagram of a flight management system according to the present embodiment. The flight management system includes a flight management apparatus 1, a user terminal 2, a flight apparatus 3, and a weather information provision apparatus 4. The flight management system may include other terminals, other apparatuses, and the like.

The flight management apparatus 1 is a computer that determines whether or not weather at a position at which the flight apparatus 3 flies satisfies a predetermined weather condition, and outputs a determination result to the user terminal. The flight management apparatus 1 is a single apparatus or includes a plurality of apparatuses. In addition, the flight management apparatus 1 may be one or a plurality of virtual servers that operate on a cloud which is a set of computer resources.

The user terminal 2 is a computer used by a user. The user terminal 2 is, for example, an information terminal such as a smartphone, a tablet terminal, or a personal computer. The user is, for example, a person who operates, manages, or possesses the flight apparatus 3. The user terminal 2 includes a display unit such as a liquid crystal display for displaying information and an operation unit such as a touch panel for receiving an operation performed by the user. The user terminal 2 transmits and receives information to and from the flight management apparatus 1 by communication.

The flight apparatus 3 is an unmanned flight apparatus such as a drone that flies on a flight path or in a flight range designated by the user and performs a predetermined work. In addition, the flight apparatus 3 may be a manned flight apparatus such as an airplane or a flyable vehicle. The work performed by the flight apparatus 3 is, for example, transport of an object on the flight path or in the flight range, imaging around the flight path or the flight range, release of an object (agrochemical or the like) on the flight path or in the flight range, or output of information (voice, light, or the like) on the flight path or in the flight range. In addition, the flight apparatus 3 includes a communication facility such as a subscriber identity module (SIM) and an antenna and can perform communication through a base station of a mobile communication network. In addition, the flight apparatus 3 may function as the flight management apparatus 1 by executing at least some of functions executed by the flight management apparatus 1.

The weather information provision apparatus 4 is an apparatus that provides weather information including weather at a current position at which the flight apparatus 3 is positioned, or a scheduled position at which the flight apparatus 3 is scheduled to be positioned. The weather information provision apparatus 4 transmits the weather information to the flight management apparatus 1 by communication. For example, the weather information provision apparatus 4 is a base station of a mobile communication network that includes a weather sensor for measuring weather. One or a plurality of weather information provision apparatuses 4 are disposed near the flight path or the flight range, and weather of each point on the flight path or in the flight range is measured.

In addition, the weather information provision apparatus 4 may be other apparatuses that can measure weather and may be, for example, a movable apparatus such as a drone or a vehicle including a weather sensor. In addition, the weather information provision apparatus 4 may be an apparatus that provides weather predicted in the future, that is, the weather information including a weather forecast.

Hereinafter, a summary of processing executed by the flight management apparatus 1 according to the present embodiment will be described. The flight management apparatus 1 receives, from the user terminal 2, flight schedule information including the flight path or the flight range in which the flight apparatus 3 is scheduled to fly, and a flight schedule period in which the flight apparatus 3 is scheduled to fly on the flight path or in the flight range ((1) in FIG. 1). The flight management apparatus 1 stores the received flight schedule information in a storage unit.

The flight management apparatus 1 acquires condition information including the weather condition that is associated with a position provided on the flight path or in the flight range in which the flight apparatus 3 is scheduled to fly ((2) in FIG. 1). The weather condition is associated in advance with each position (point) on the flight path or in the flight range.

The flight management apparatus 1 acquires, from the weather information provision apparatus 4, the weather information including the weather at the current position at which the flight apparatus 3 is positioned, or the scheduled position at which the flight apparatus 3 is scheduled to be positioned ((3) in FIG. 1). The flight management apparatus 1 determines whether or not the weather included in the weather information satisfies the weather condition associated with the current position or the scheduled position in the condition information ((4) in FIG. 1). The flight management apparatus 1 outputs information corresponding to the determination result to the user terminal 2 ((5) in FIG. 1).

With such a configuration, the flight management apparatus 1 determines whether or not the weather at the current position or the scheduled position of the flight apparatus 3 flying on the designated flight path or in the designated flight range satisfies the weather condition associated with the current position or the scheduled position. Thus, occurrence of a problem caused by the weather in flight of the flight apparatus 3 can be suppressed.

Configuration of Flight Management Apparatus 1

Figure 2:
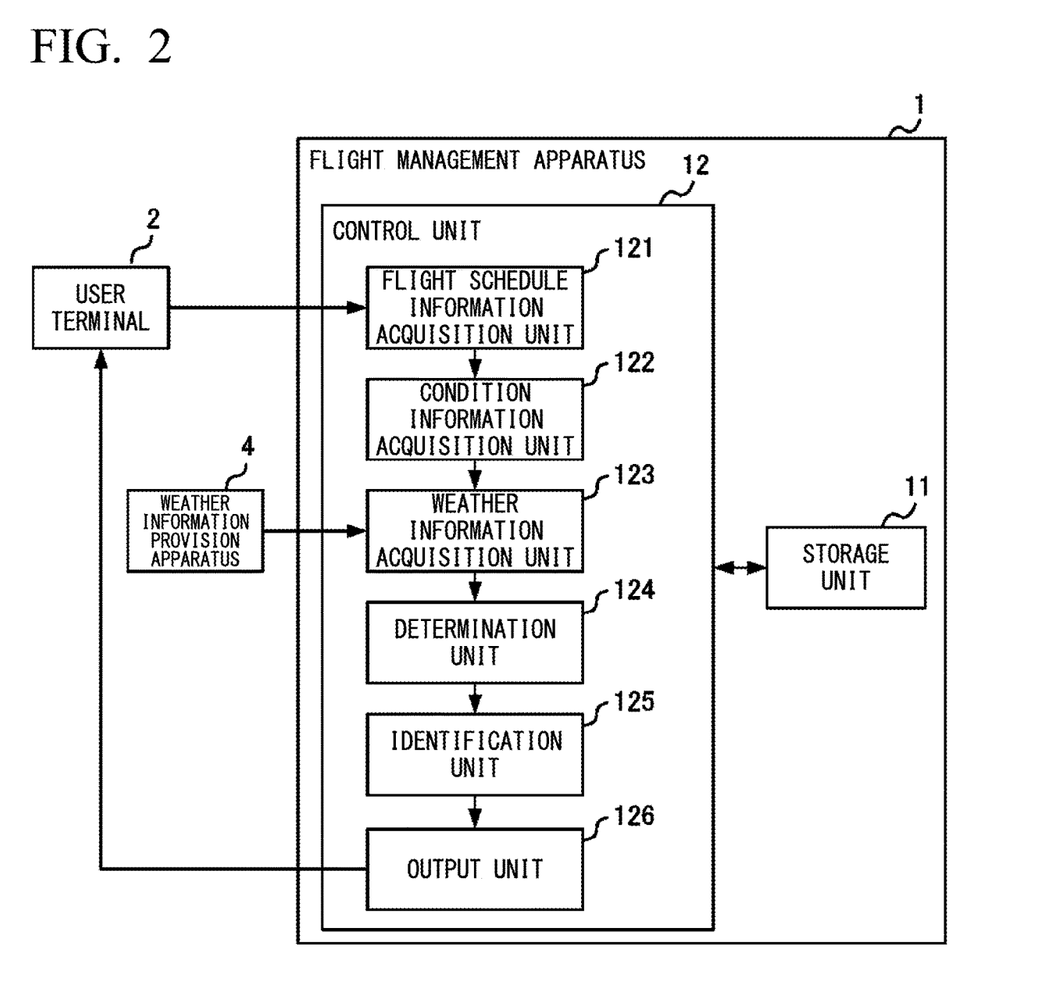
FIG. 2 is a block diagram of a flight management apparatus according to the embodiment.

FIG. 2 is a block diagram of the flight management apparatus 1 according to the present embodiment. In FIG. 2, arrows indicate the main flow of data, and a flow of data other than shown in FIG. 2 may be present. In FIG. 2, each block indicates a configuration in functional units and does not indicate a configuration in hardware (apparatus) units. Thus, the blocks shown in FIG. 2 may be implemented in a single apparatus or may be separately implemented in a plurality of apparatuses. Exchange of data between the blocks may be performed through any means such as a data bus, a network, or a portable storage medium.

The flight management apparatus 1 includes a storage unit 11 and a control unit 12. The storage unit 11 is a storage medium including a read only memory (ROM), a random access memory (RAM), a hard disk drive, and the like. The storage unit 11 stores in advance a program to be executed by the control unit 12. In addition, the storage unit 11 stores the flight schedule information including the flight path or the flight range in which the flight apparatus 3 is scheduled to fly, and the flight schedule period in which the flight apparatus 3 is scheduled to fly on the flight path or in the flight range. In addition, the storage unit 11 stores the condition information including the weather condition that is associated with the position provided on the flight path or in the flight range in which the flight apparatus 3 is scheduled to fly. In addition, the storage unit 11 may store aircraft information related to an aircraft of the flight apparatus 3 and/or operator information related to an operator who operates the flight apparatus 3.

The control unit 12 includes a flight schedule information acquisition unit 121, a condition information acquisition unit 122, a weather information acquisition unit 123, a determination unit 124, an identification unit 125, and an output unit 126. The control unit 12 is a processor such as a central processing unit (CPU) and functions as the flight schedule information acquisition unit 121, the condition information acquisition unit 122, the weather information acquisition unit 123, the determination unit 124, the identification unit 125, and the output unit 126 by executing the program stored in the storage unit 11. Each unit of the control unit 12 may be separately implemented in a plurality of apparatuses constituting the flight management apparatus 1.

Hereinafter, a configuration for executing processing according to the present embodiment by the flight management apparatus 1 will be described. The flight schedule information acquisition unit 121 receives, from the user terminal 2, the flight schedule information including the flight path or the flight range in which the flight apparatus 3 is scheduled to fly, and the flight schedule period in which the flight apparatus 3 is scheduled to fly on the flight path or in the flight range.

Figure 3:
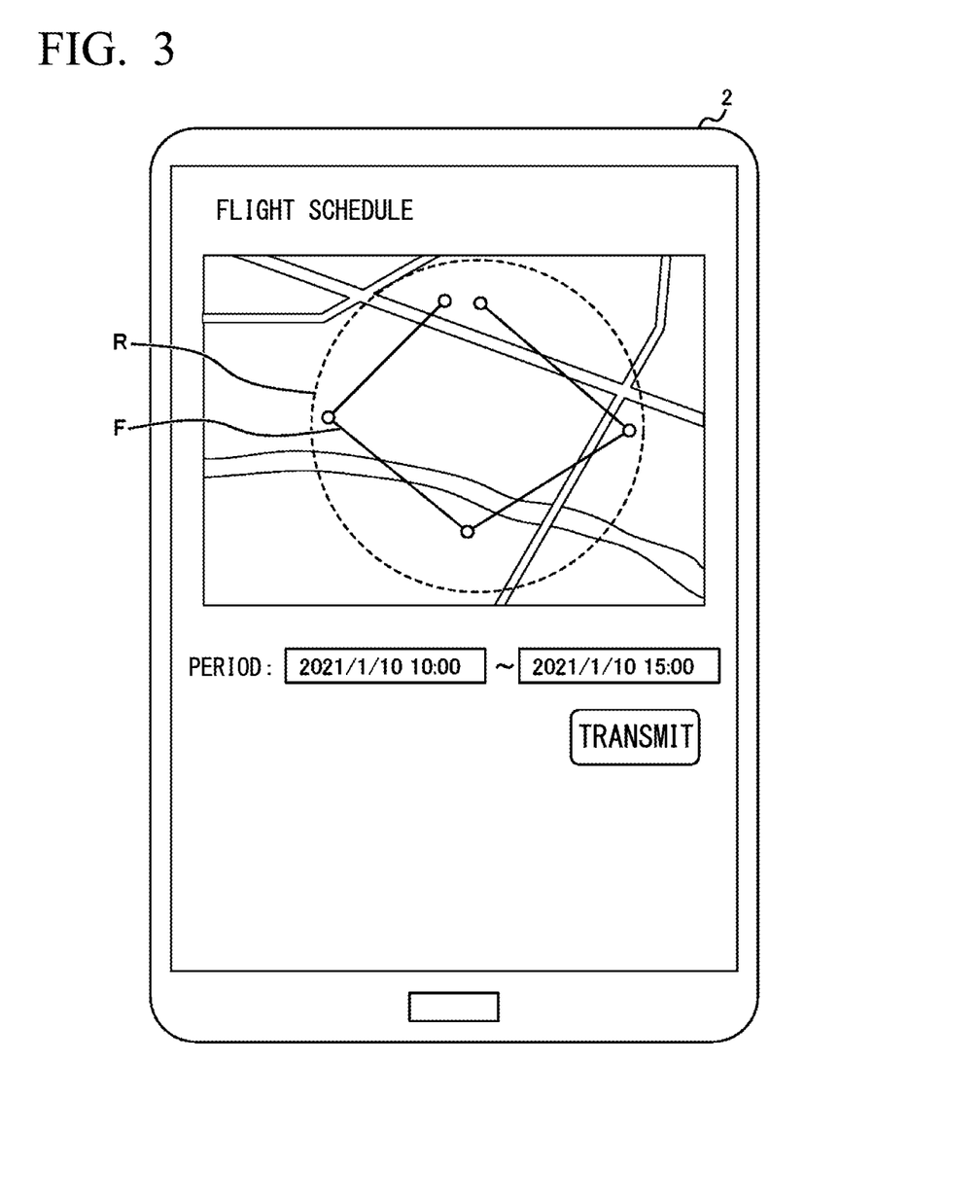
FIG. 3 is a schematic diagram of a flight schedule screen for receiving an input of flight schedule information in a user terminal.

FIG. 3 is a schematic diagram of a flight schedule screen for receiving an input of the flight schedule information in the user terminal 2. For example, the user terminal 2 receives a planar range (flight area) designated on a map displayed on the flight schedule screen as a flight range R. In addition, the user terminal 2 receives a linear path designated in the flight range R on the map displayed on the flight schedule screen as a flight path F. In addition, the user terminal 2 may receive a designation of only one of the flight path F and the flight range R. In addition, the user terminal 2 may receive a designation of the flight path F or the flight range R in three dimensions including a position and an altitude.

In addition, the user terminal 2 receives a designation of the flight schedule period in which the flight apparatus 3 flies. The flight schedule period is, for example, a period that is designated as a start date and time and an end date and time. In addition, the user terminal 2 may receive a designation of an operation content or a work content to be performed on the flight path or in the flight range by the flight apparatus 3. For example, the operation content is a type of operation such as hovering, take-off and landing, and turning to be performed by the flight apparatus 3. For example, the work content is a type of work such as imaging, monitoring, or delivery to be performed by the flight apparatus 3. The operation content or the work content may be designated for the entire flight path or the entire flight range or may be designated for each point on the flight path or in the flight range. The user terminal 2 may receive an input of other information.

In the flight management apparatus 1, the flight schedule information acquisition unit 121 acquires the flight schedule information including the flight path or the flight range and the flight schedule period from the user terminal 2. The flight schedule information acquisition unit 121 stores the flight schedule information received from the user terminal 2 in the storage unit 11.

The condition information acquisition unit 122 acquires the condition information including the weather condition that is associated with the position provided on the flight path or in the flight range in which the flight apparatus 3 is scheduled to fly. For example, the condition information is set in advance by a manager of the flight management apparatus 1 or the user of the user terminal 2 and stored in the storage unit 11.

The weather condition is a condition related to weather for the flight apparatus 3 to fly on the flight path or in the flight range. The weather condition is represented by, for example, at least one of a wind speed, a wind direction, and precipitation. For example, the weather condition related to the wind speed is such that the wind speed is a predetermined reference value or less. For example, the weather condition related to the wind direction is such that the wind direction is a predetermined direction (a tailwind, a headwind, a crosswind, and the like with respect to a traveling direction) or the wind direction is not the predetermined direction. For example, the weather condition related to the precipitation is such that the precipitation (i.e., an amount of rain per unit time period) is a predetermined reference value or less. The weather condition is not limited to the specific conditions explained here and may include other conditions related to weather.

The weather condition is associated with each of a plurality of different positions on the flight path or in the flight range. For example, the position on the flight path or in the flight range is identified by a range of coordinates (a latitude and a longitude) at which the flight apparatus 3 is positioned, an address at which the flight apparatus 3 is positioned, or a base station with which the flight apparatus 3 can communicate. Accordingly, the flight management apparatus 1 can perform the determination for the flight of the flight apparatus 3 using the weather condition designated for each position.

Figure 4A:
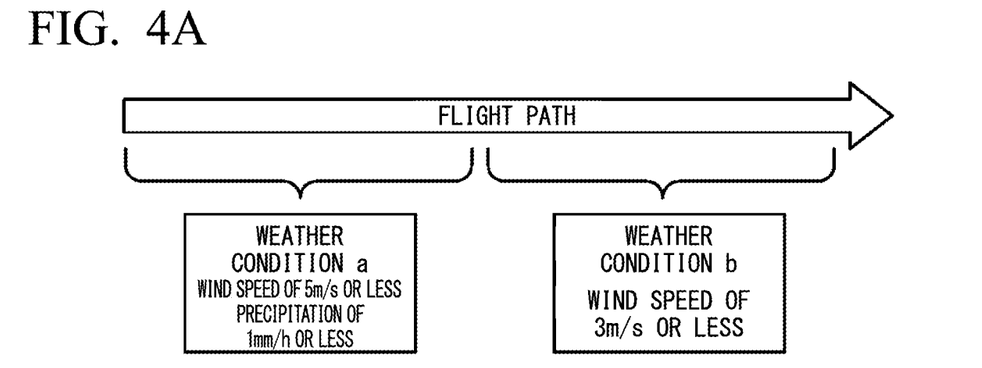
FIG. 4A and FIG. 4B are schematic diagrams for describing weather conditions.

FIG. 4A is a schematic diagram for describing the weather condition associated with each of the plurality of different positions. In the example in FIG. 4A, weather conditions that are different from each other are associated with a first half of the flight path and a second half of the flight path. The weather condition is not limited to be associated with the first half and the second half of the flight path and may be associated with positions obtained by dividing the flight path or the flight range in other units.

In addition, the weather condition may be associated with the operation content or the work content. For example, the operation content is a type of operation such as hovering, take-off and landing, and turning to be performed by the flight apparatus 3. For example, the work content is a type of work such as imaging, monitoring, or delivery to be performed by the flight apparatus 3. In addition, the weather condition may be associated with the weight of a target object of operation or work (e.g., the weight of a load transported by the flight apparatus).

Figure 4B:
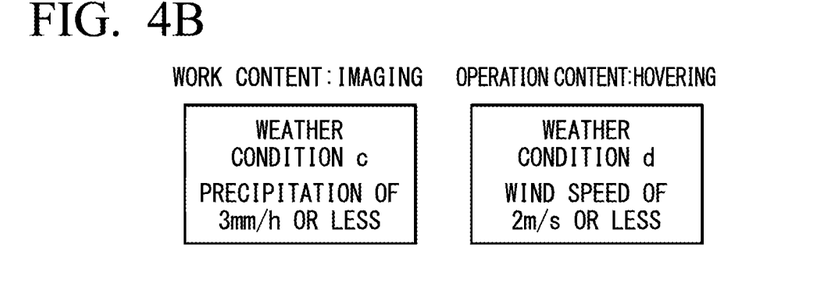

FIG. 4B is a schematic diagram for describing the weather condition associated with the operation content or the work content. In the example in FIG. 4B, weather conditions that are different from each other are associated with a work content "imaging" and an operation content "hovering". In addition, the weather condition may be associated with a combination of the position on the flight path or the flight range and the work content or the operation content.

In addition, the weather condition may be associated with the number of other flight apparatuses 3 (i.e., one or a plurality of flight apparatuses 3 different from the flight apparatus 3 of a determination target) that fly in the flight schedule period in a predetermined region including the position on the flight path or in the flight range. For example, the predetermined region for which the number of other flight apparatuses 3 is counted is a region of a predetermined size including the flight apparatuses 3 or a region (cell) in which the flight apparatuses 3 communicate with the same base station.

In addition, the weather condition may be associated with a type of aircraft of the flight apparatus 3. The type of aircraft is a type of aircraft corresponding to characteristics of the flight apparatus 3 affecting the flight, such as the flight speed, the size, and the weight. In addition, the type of aircraft may indicate whether the flight apparatus 3 is automatically operated (autopilot) or manually operated. In addition, in a case in which the flight apparatus 3 is manually operated, the weather condition may be associated with a degree of skill (operation level) of the operator who operates the flight apparatus 3.

The weather information acquisition unit 123 acquires, from the weather information provision apparatus 4, the weather information including the weather at the current position at which the flight apparatus 3 is positioned, or the scheduled position at which the flight apparatus 3 is scheduled to be positioned. For example, while the flight apparatus 3 is flying on the flight path or in the flight range, the weather information acquisition unit 123 identifies the current position at which the flight apparatus 3 is positioned. In this case, the weather information acquisition unit 123 receives the current position identified by the flight apparatus 3 on the basis of a global positioning system (GPS) signal or the base station (cell) with which the flight apparatus 3 can communicate, from the flight apparatus 3 in association with the current time.

In addition, for example, before the flight apparatus 3 flies on the flight path or in the flight range, or while the flight apparatus 3 is flying on the flight path or in the flight range, the weather information acquisition unit 123 identifies the scheduled position at which the flight apparatus 3 is scheduled to be positioned. In this case, the weather information acquisition unit 123 estimates a position on the flight path or in the flight range at each time of the flight schedule period on the basis of the flight schedule information and identifies the estimated position as the scheduled position in association with each time in the flight schedule period.

Then, the weather information acquisition unit 123 acquires the weather information including the weather at the identified current position or the identified scheduled position. For example, the weather information acquisition unit 123 acquires, from the weather information provision apparatus 4, the weather information including the weather that is measured within a predetermined range from the identified current position or the identified scheduled position by the weather information provision apparatus 4 using the weather sensor. In addition, the weather information acquisition unit 123 may acquire, from the weather information provision apparatus 4, the weather information including weather (i.e., a weather forecast) that is predicted at the identified current position or the identified scheduled position.

The determination unit 124 determines whether or not the weather at the current position or the scheduled position of the flight apparatus 3 satisfies the weather condition associated with the current position or the scheduled position in the condition information acquired by the condition information acquisition unit 122 on the basis of the weather information acquired by the weather information acquisition unit 123. The determination unit 124 passes the determination result to the output unit 126.

In a case of performing the determination for the current position, the determination unit 124 determines whether or not the weather of the current position of the flight apparatus 3 at the current time satisfies the weather condition associated with the current position in the condition information on the basis of the weather information acquired by the weather information acquisition unit 123.

Figure 5A:
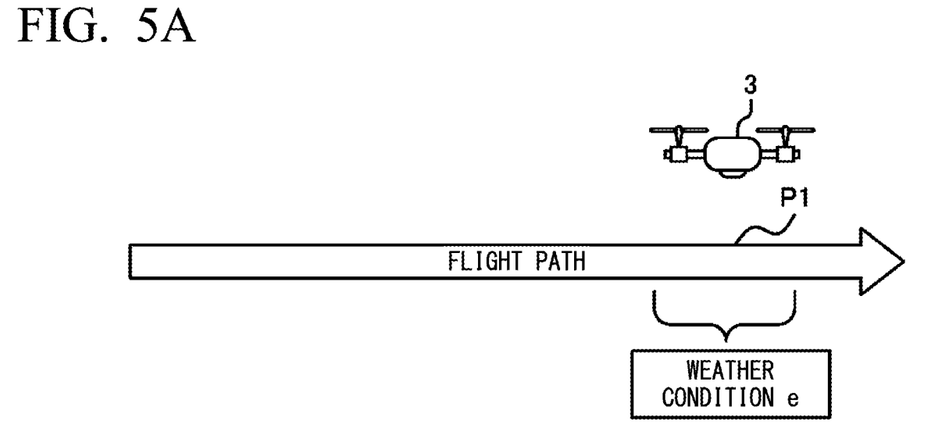
FIG. 5A is a schematic diagram for describing processing in a case in which a determination unit performs a determination for a current position.

FIG. 5A is a schematic diagram for describing processing in a case in which the determination unit 124 performs the determination for the current position. In the example in FIG. 5A, a current position P1 of the flight apparatus 3 is associated with a weather condition e. The determination unit 124 determines whether or not weather of the current position P1 included in the weather information satisfies the weather condition e at the current time.

On the other hand, in a case of performing the determination for the scheduled position, the determination unit 124 estimates a scheduled time at which the flight apparatus 3 reaches the scheduled position on the basis of a distance or a path from the current position to the scheduled position of the flight apparatus 3 and a speed of the flight apparatus 3. The determination unit 124 determines whether or not the weather of the scheduled position predicted for the scheduled time satisfies the weather condition associated with the scheduled position in the condition information on the basis of the weather information acquired by the weather information acquisition unit 123.

Figure 5B:
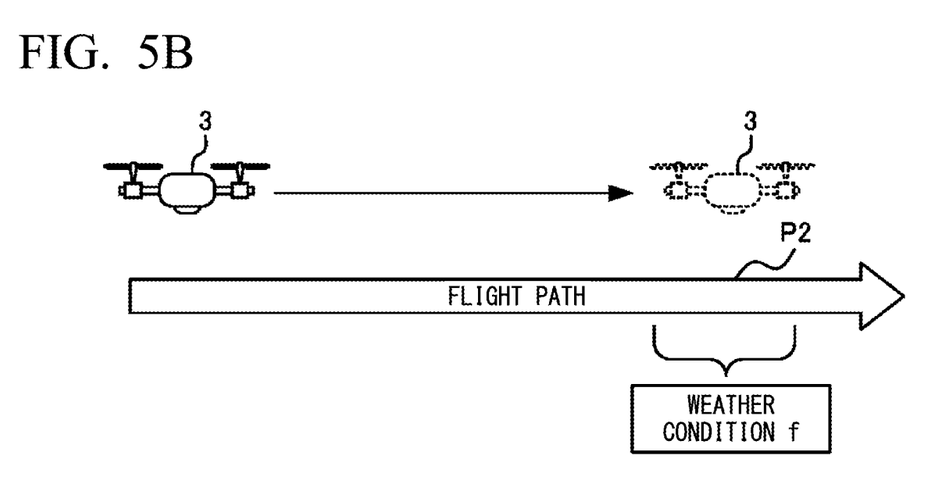
FIG. 5B is a schematic diagram for describing processing in a case in which the determination unit performs a determination for a scheduled position.

FIG. 5B is a schematic diagram for describing the processing in a case in which the determination unit 124 performs the determination for the scheduled position. In the example in FIG. 5B, a scheduled position P2 of the flight apparatus 3 is associated with a weather condition f. The determination unit 124 determines whether or not weather of the scheduled position P2 included in the weather information satisfies the weather condition f at a scheduled time at which the flight apparatus 3 reaches the scheduled position P2.

In addition, the determination unit 124 may determine whether or not the weather at the current position or the scheduled position of the flight apparatus 3 satisfies the weather condition associated with the current position or the scheduled position and the operation content or the work content to be performed at the current position or the scheduled position by the flight apparatus 3 on the basis of the weather information acquired by the weather information acquisition unit 123.

In this case, the determination unit 124 identifies the operation content or the work content to be performed at the current position or the scheduled position by the flight apparatus 3 on the basis of the flight schedule information and performs the determination using the identified operation content or the identified work content. Accordingly, the flight management apparatus 1 can perform the determination for the flight of the flight apparatus 3 using the weather condition set for each operation content or each work content to be performed by the flight apparatus 3.

Furthermore, the determination unit 124 may perform the determination using the weather condition associated with the weight of the target object of operation or work (e.g., the weight of the load transported by the flight apparatus), in addition to the operation content or the work content. Accordingly, because the flight apparatus 3 is likely to be affected by weather, for example, in a case in which the flight apparatus 3 transports a heavy load, the flight management apparatus 1 can perform the determination for the flight of the flight apparatus 3 using a stricter weather condition.

In addition, the determination unit 124 may determine whether or not the weather at the current position or the scheduled position of the flight apparatus 3 satisfies the weather condition associated with the current position or the scheduled position and the number of other flight apparatuses 3 in the predetermined region including the current position or the scheduled position on the basis of the weather information acquired by the weather information acquisition unit 123.

In this case, the determination unit 124 calculates the number of other flight apparatuses 3 positioned in the predetermined region (e.g., in the cell of the base station with which the flight apparatus 3 can communicate) including the current position or the scheduled position at the current time or the scheduled time using the flight schedule information about a plurality of flight apparatuses 3 stored in the storage unit 11. The determination unit 124 performs the determination using the calculated number of other flight apparatuses 3. Accordingly, because there is a possibility of insufficiency of a communication bandwidth for performing a flight control of the flight apparatus 3, for example, in a case in which a great number of flight apparatuses 3 fly in close regions, the flight management apparatus 1 can perform the determination for the flight of the flight apparatus 3 using a stricter weather condition.

In addition, the determination unit 124 determines whether or not the weather at the current position or the scheduled position of the flight apparatus 3 satisfies the weather condition associated with the current position or the scheduled position and a type of flight apparatus 3 on the basis of the weather information acquired by the weather information acquisition unit 123.

In this case, the determination unit 124 identifies the type of flight apparatus 3 on the basis of the aircraft information about the flight apparatus 3, which is stored in advance in the storage unit 11, and performs the determination using the identified type.

In addition, in a case in which the identified type of flight apparatus 3 indicates a manual operation, the determination unit 124 may identify the degree of skill (operation level) of the operator on the basis of the operator information related to the operator who operates the flight apparatus 3, which is stored in advance in the storage unit 11, and perform the determination using the weather condition associated with the identified degree of skill. Accordingly, because the effect of weather varies depending on the type of aircraft of the flight apparatus 3, the flight management apparatus 1 can perform the determination for the flight of the flight apparatus 3 using a more appropriate weather condition.

The determination unit 124 performs the determination in at least one of before take-off, during flight, and before landing of the flight apparatus 3. In a case of performing the determination in both of before take-off and during flight, the determination unit 124, before the flight apparatus 3 takes off, determines whether or not the flight apparatus 3 can take off on the basis of whether or not the weather on the designated flight path or in the designated flight range satisfies the weather condition, and determines that the flight apparatus 3 can take off on a condition that it is determined that the weather condition is satisfied. Then, while the flight apparatus 3 is flying after the flight apparatus 3 has taken off, the determination unit 124 determines again whether or not the weather on the designated flight path or in the designated flight range satisfies the weather condition. Accordingly, the flight management apparatus 1 can determine whether or not the weather satisfies the weather condition even after the flight apparatus 3 has taken off, and can suppress an effect of a weather change on the flight of the flight apparatus 3. Similarly, the determination unit 124, before the flight apparatus 3 lands, determines whether or not the weather on the designated flight path or in the flight range satisfies the weather condition.

In a case in which the determination unit 124 determines that the weather on the flight path or in the flight range does not satisfy the weather condition, the identification unit 125 identifies an alternative flight path or an alternative flight range different from the flight path or the flight range. In this case, the determination unit 124 determines whether or not the weather condition is satisfied for the weather on a path or in a range different from the flight path or the flight range using the above method. For example, the path or the range different from the flight path or the flight range is another path having a common destination with the designated flight path or the designated flight range, or a path that the flight apparatus 3 flying on the designated flight path or in the designated flight range uses for escaping to a predetermined port.

In a case in which the determination unit 124 determines that the weather on the path or in the range satisfies the weather condition, the identification unit 125 identifies the path or the range as the alternative flight path or the alternative flight range. The identification unit 125 passes information indicating the identified alternative flight path or the identified alternative flight range to the output unit 126. In addition, even in a case in which the weather on the path or in the range different from the flight path or the flight range does not satisfy the weather condition, the identification unit 125 may identify the path or the range as the alternative flight path or the alternative flight range in a case in which the weather is relatively better than the weather on the flight path or in the flight range (i.e., in a case in which the difference from the weather condition is small).

Figure 6:
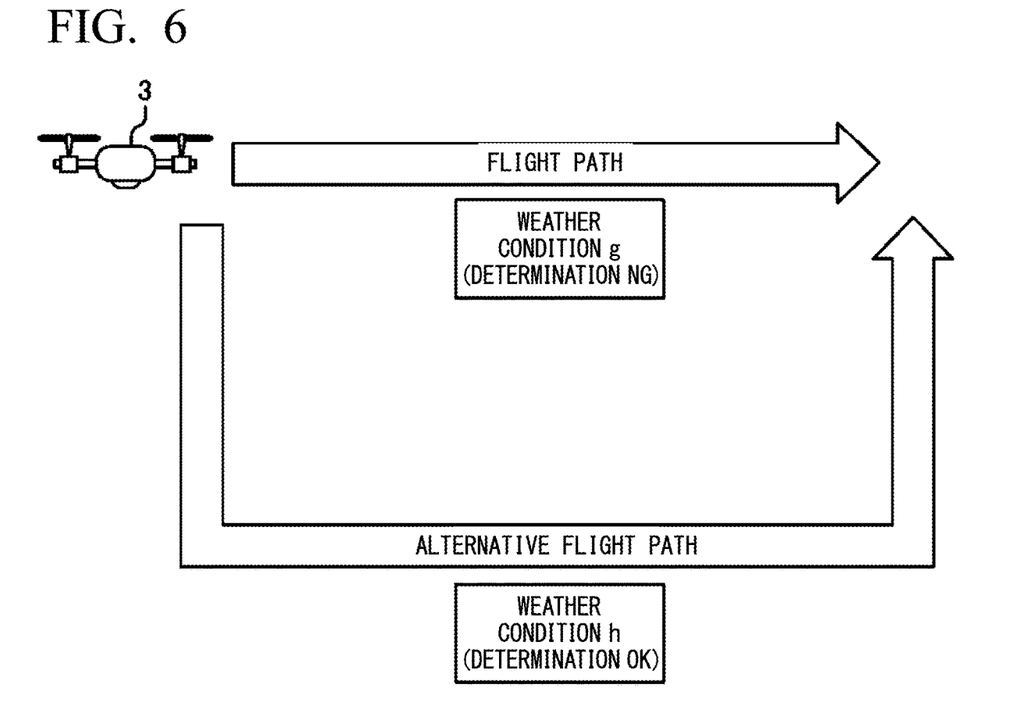
FIG. 6 is a schematic diagram for describing an alternative flight path or an alternative flight range identified by an identification unit.

FIG. 6 is a schematic diagram for describing the alternative flight path or the alternative flight range identified by the identification unit 125. In the example in FIG. 6, the determination unit 124 determines that the weather on the flight path does not satisfy a weather condition g, and thus a state in which the identification unit 125 identifies the alternative flight path is represented. In this case, the determination unit 124 determines that the weather on the alternative flight path satisfies a weather condition h. Accordingly, even in a case in which it is determined that the weather on the designated flight path or in the designated flight range does not satisfy the weather condition, the flight management apparatus 1 can propose an alternative flight path or an alternative flight range satisfying the weather condition.

The output unit 126 outputs the information corresponding to the determination result of the determination unit 124 to the user terminal 2. For example, the information corresponding to the determination result includes a text or an image representing the determination result of the determination unit 124. In addition, as the information corresponding to the determination result of the determination unit 124, the output unit 126 may output information that indicates the alternative flight path or the alternative flight range identified by the identification unit 125. The user terminal 2 displays the information corresponding to the determination result output by the flight management apparatus 1 on the display unit.

In such a manner, the flight management apparatus 1 determines whether or not the weather at the current position or the scheduled position of the flight apparatus 3 flying on the flight path or in the flight range satisfies the weather condition associated with the current position or the scheduled position, and provides the information corresponding to the determination result to the user. The user can stop or pause the flight of the flight apparatus 3 or cause the flight apparatus 3 to fly on the alternative flight path or in the alternative flight range on the basis of the information corresponding to the determination result, and thus occurrence of a problem caused by weather in the flight of the flight apparatus 3 can be suppressed.

Sequence of Flight Management Method

Figure 7:
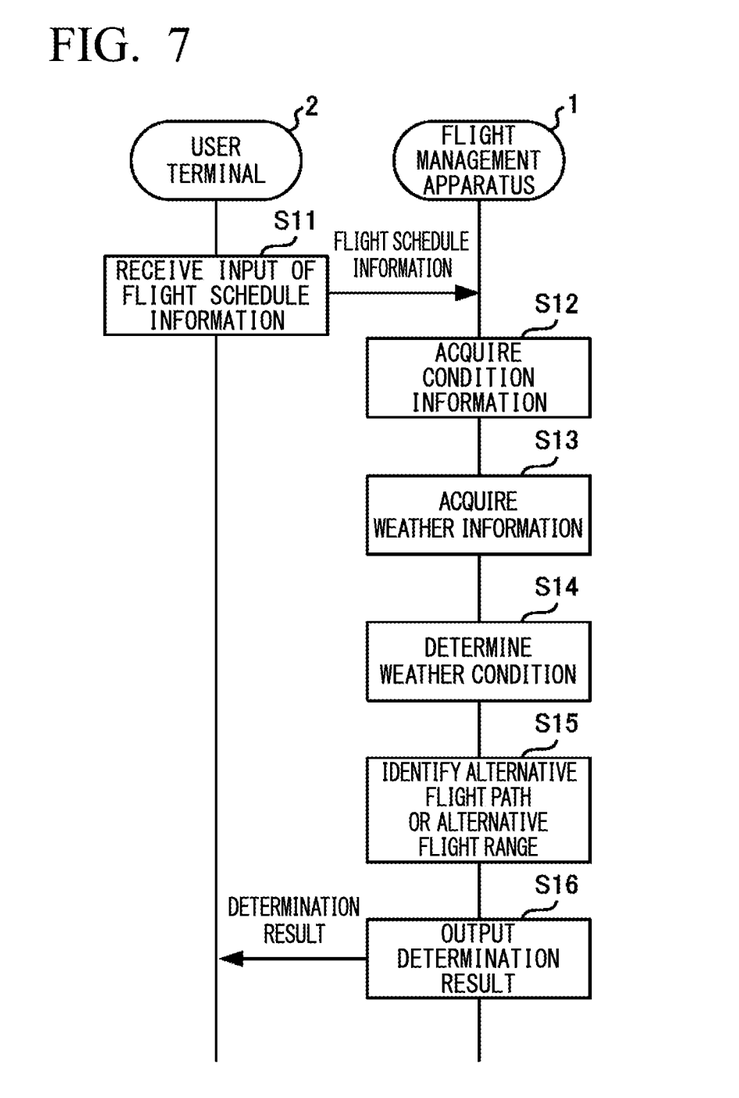
FIG. 7 is a diagram showing a sequence of a flight management method executed by the flight management system.

FIG. 7 is a diagram showing a sequence of a flight management method executed by the flight management system. The user terminal 2 receives the input of the flight schedule information on the flight schedule screen (S11). For example, the user terminal 2 receives the planar range (flight area) designated on the map displayed on the flight schedule screen as the flight range. In addition, the user terminal 2 receives the linear path designated in the flight range on the map displayed on the flight schedule screen as the flight path.

In the flight management apparatus 1, the flight schedule information acquisition unit 121 acquires the flight schedule information including the flight path or the flight range and the flight schedule period from the user terminal 2. The flight schedule information acquisition unit 121 stores the flight schedule information received from the user terminal 2 in the storage unit 11.

The condition information acquisition unit 122 acquires the condition information including the weather condition that is associated with the position provided on the flight path or in the flight range in which the flight apparatus 3 is scheduled to fly (S12). The weather information acquisition unit 123 acquires, from the weather information provision apparatus 4, the weather information including the weather at the current position at which the flight apparatus 3 is positioned, or the scheduled position at which the flight apparatus 3 is scheduled to be positioned (S13).

The determination unit 124 determines whether or not the weather at the current position or the scheduled position of the flight apparatus 3 satisfies the weather condition associated with the current position or the scheduled position in the condition information acquired by the condition information acquisition unit 122 on the basis of the weather information acquired by the weather information acquisition unit 123 (S14). In a case in which the determination unit 124 determines that the weather on the flight path or in the flight range does not satisfy the weather condition, the identification unit 125 identifies the alternative flight path or the alternative flight range different from the flight path or the flight range (S15).

The output unit 126 outputs the information corresponding to the determination result of the determination unit 124 to the user terminal 2 (S16). For example, the information corresponding to the determination result includes the text or the image representing the determination result of the determination unit 124. In addition, as the information corresponding to the determination result of the determination unit 124, the output unit 126 may output the information that indicates the alternative flight path or the alternative flight range identified by the identification unit 125. The user terminal 2 displays the information corresponding to the determination result output by the flight management apparatus 1 on the display unit.

Advantageous Effect of Embodiment

The flight management apparatus 1 according to the present embodiment determines whether or not the weather at the current position or the scheduled position of the flight apparatus 3 flying on the flight path or in the flight range satisfies the weather condition associated with the current position or the scheduled position. Accordingly, even in a case in which the flight apparatus 3 flies in a location close to a building or performs different works or operations depending on locations, the flight management apparatus 1 determines whether or not the weather satisfies the weather condition for each current position or scheduled position of the flight apparatus 3 on the flight path or in the flight range, and thus occurrence of a problem caused by weather in the flight of the flight apparatus 3 can be suppressed.

It should be noted that the present invention can contribute to Goal 9 "Industry, Innovation, and Infrastructure" of Sustainable Development Goals (SDGs) led by the United Nations.

While the present invention has been described above using the embodiment, the technical scope of the present invention is not limited to the scope disclosed in the embodiment, and various modifications and changes can be made within the scope of the gist of the present invention. For example, the entirety or part of an apparatus can be configured by functional or physical distribution/integration in any units. In addition, the embodiment of the present invention includes a new embodiment that results from any combination of a plurality of embodiments. An advantageous effect of the new embodiment resulting from the combination also has the advantageous effect of the original embodiment.

Processors of the flight management apparatus 1 and the user terminal 2 are subjects of each step (process) included in the flight management method shown in FIG. 7. That is, the processors of the flight management apparatus 1 and the user terminal 2 execute the flight management method shown in FIG. 7 by reading a program for executing the flight management method shown in FIG. 7 from a storage unit and executing the program. Some of the steps included in the flight management method shown in FIG. 7 may be omitted, the order of the steps may be changed, and a plurality of steps may be performed in parallel.

What is claimed is:

1. A flight management apparatus comprising:
at least one memory configured to store instructions; and
at least one processor configured to execute the instructions to:
acquire condition information including a weather condition indicating a reference with respect to weather when a flight apparatus flies, wherein weather conditions are associated with a plurality of positions provided on a flight path or in a flight range in which the flight apparatus is scheduled to fly and are different from each other according to each of the plurality of positions, wherein the flight apparatus is automatically operated using an autopilot;

acquire weather information including the weather at a current position at which the flight apparatus is positioned, or a scheduled position at which the flight apparatus is scheduled to be positioned;

determine whether or not the weather at the current position or the scheduled position satisfies the weather condition associated with the current position or the scheduled position in the condition information;

acquire the condition information including the weather condition that is associated with a combination of an operation content or a work content and a position, the operation content indicating a type of an operation to be performed on the flight path or in the flight range by the flight apparatus, and the work content indicating a type of a work to be performed on the flight path or in the flight range by the flight apparatus;

determine whether or not the weather satisfies the weather condition associated with the combination of the operation content or the work content and the current position or the scheduled position; and control, using the autopilot, based on a result of the determination, the flight apparatus to fly on an alternative flight path that satisfies the weather condition associated with the combination of the operation content or the work content and the current position or the scheduled position.

2. The flight management apparatus according to claim 1, wherein the at least one processor is configured to execute the instructions to determine whether or not the weather at the current position at a current time satisfies the weather condition associated with the current position in the condition information.

3. The flight management apparatus according to claim 1, wherein the at least one processor is configured to execute the instructions to determine whether or not the weather of the scheduled position predicted for a scheduled time at which the flight apparatus reaches the scheduled position satisfies the weather condition associated with the scheduled position in the condition information.

4. The flight management apparatus according to claim 1, wherein the at least one processor is configured to execute the instructions to:
identify the alternative flight path different from the flight path in a case in which it is determined that the weather does not satisfy the weather condition.

5. The flight management apparatus according to claim 1, wherein the operation content indicates the type of the operation to be performed on partial points in the flight path or the flight range by the flight apparatus or the work content indicates the type of the work to be performed on partial points in the flight path or the flight range by the flight apparatus.

6. The flight management apparatus according to claim 5, wherein
the operation content includes at least one of hovering, take-off and landing, or turning, and
the work content includes at least one of imaging, monitoring, or delivery.

7. The flight management apparatus according to claim 1, wherein the at least one processor is configured to execute the instructions to:
acquire a number of other flight apparatuses flying in a predetermined region representing a cell, in which the flight apparatus communicate with a base station, and acquire the condition information including the weather condition that is associated with a combination of the position and the acquired number of other flight apparatuses, and
determine whether or not the weather satisfies the weather condition associated with the combination of the current position or the scheduled position and the number of other flight apparatuses flying in the predetermined region including the current position or the scheduled position.

8. The flight management apparatus according to claim 1, wherein the at least one processor is configured to execute the instructions to:
acquire the condition information including the weather condition that is associated with the position and a type of aircraft of the flight apparatus, and
determine whether or not the weather satisfies the weather condition associated with the current position or the scheduled position and the type.

9. The flight management apparatus according to claim 1, wherein the at least one processor is configured to execute the instructions to acquire the condition information including the weather condition that is associated with each of a plurality of different positions provided on the flight path or in the flight range.

10. The flight management apparatus according to claim 1, wherein the at least one processor is configured to execute the instructions to:
determine, before take-off of the flight apparatus, whether or not the take-off of the flight apparatus is possible on the basis of the weather on the flight path or in the flight range, and
determine, after that the take-off of the flight apparatus is possible, whether or not the weather satisfies the weather condition during flight of the flight apparatus.

11. The flight management apparatus according to claim 1, wherein the at least one processor is configured to execute the instructions to:
identify an alternative flight range different from the flight range in a case in which it is determined that the weather does not satisfy the weather condition; and
control, using the autopilot, the flight apparatus to fly in the alternative flight range.

12. A flight management method executed by one or more processors provided in a flight management apparatus, the method comprising:
receiving, by the one or more processors, flight schedule information including a flight path or a flight range in which a flight apparatus is scheduled to fly, from a terminal device that transmits and receives information to and from the flight management apparatus, wherein the flight apparatus is automatically operated using an autopilot;

acquiring, by the one or more processors, condition information including a weather condition indicating a reference with respect to weather when the flight apparatus flies, wherein weather conditions are associated with a plurality of positions provided on the flight path or in the flight range and are different from each other according to each of the plurality of positions;

acquiring, by the one or more processors, weather information including the weather at a current position at which the flight apparatus is positioned, or a scheduled position at which the flight apparatus is scheduled to be positioned;

performing, by the one or more processors, a determination as to whether or not the weather at the current position or the scheduled position satisfies the weather condition associated with the current position or the scheduled position in the condition information;

acquiring, by the one or more processors, the condition information including the weather condition that is associated with a combination of an operation content or a work content and a position, the operation content indicating a type of an operation to be performed on the flight path or in the flight range by the flight apparatus, and the work content indicating a type of a work to be performed on the flight path or in the flight range by the flight apparatus;

determining, by the one or more processors, whether or not the weather satisfies the weather condition associated with the combination of the operation content or the work content and the current position or the scheduled position; and controlling, using the autopilot, based on a result of the determination, the flight apparatus to fly on an alternative flight path that satisfies the weather condition associated with the combination of the operation content or the work content and the current position or the scheduled position.

13. The flight management method according to claim 12, further comprising:

identifying the alternative flight path different from the flight path in a case in which it is determined that the weather does not satisfy the weather condition.

14. The flight management apparatus according to claim 12, further comprising:

identifying an alternative flight range different from the flight range in a case in which it is determined that the weather does not satisfy the weather condition; and controlling, using the autopilot, the flight apparatus to fly in the alternative flight range.

\* \* \* \* \*